United States Patent
El Kaissi

(10) Patent No.: US 10,365,798 B1
(45) Date of Patent: Jul. 30, 2019

(54) FEEDBACK MANAGER FOR INTEGRATION WITH AN APPLICATION

(71) Applicant: LinkedIn Corporation, Mountain View, CA (US)

(72) Inventor: Muhieddine El Kaissi, Dublin, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 269 days.

(21) Appl. No.: 14/991,832

(22) Filed: Jan. 8, 2016

(51) Int. Cl.
*G06F 3/00* (2006.01)
*G06F 3/0484* (2013.01)
*G06F 3/0482* (2013.01)

(52) U.S. Cl.
CPC .......... *G06F 3/0484* (2013.01); *G06F 3/0482* (2013.01)

(58) Field of Classification Search
CPC .................................................. G06F 3/0484
USPC ....................................................... 715/710
See application file for complete search history.

(56) References Cited

U.S. PATENT DOCUMENTS

| | | | |
|---|---|---|---|
| 5,933,849 A | 8/1999 | Srbljic et al. | |
| 6,073,168 A | 6/2000 | Mighdoll et al. | |
| 7,454,457 B1 | 11/2008 | Lowery et al. | |
| 8,117,396 B1 | 2/2012 | Fair et al. | |
| 2002/0174302 A1 | 11/2002 | Frank | |
| 2007/0123204 A1* | 5/2007 | Inukai ............... | H04M 1/27455 455/403 |
| 2007/0245090 A1 | 10/2007 | King et al. | |
| 2008/0092060 A1* | 4/2008 | Berg .................. | G06F 17/3089 715/748 |
| 2010/0250834 A1 | 9/2010 | Trika et al. | |
| 2012/0123823 A1* | 5/2012 | Finkelstein ............ | G06Q 30/02 705/7.32 |
| 2014/0006538 A1 | 1/2014 | Oikonomou | |
| 2015/0006681 A1 | 1/2015 | Lim et al. | |

OTHER PUBLICATIONS

"Tumblr/TMCache", https://github.com/tumblr/TMCache.
"Pinterest/PINCache", https://github.com/pinterest/PINCache.
"Haneke/HanekeSwift", https://github.com/Haneke/HanekeSwift.
"Non Final Office Action Issued in U.S. Appl. No. 14/991,820", dated Jun. 29, 2018, 21 Pages.

* cited by examiner

*Primary Examiner* — Andrey Belousov
(74) *Attorney, Agent, or Firm* — Park, Vaughan, Fleming & Dowler LLP

(57) ABSTRACT

The disclosed embodiments provide a method, apparatus, and system for obtaining user ratings and/or feedback for a software application. During operation, the system tracks one or more interactions between a user and the application, wherein the application is configured to execute on an electronic device. While tracking the interactions, the system determines whether the interactions meet or exceed a familiarity threshold, wherein meeting or exceeding the familiarity threshold indicates that the user would be more likely than not to provide an informed rating for the application. Next, if the one or more interactions meet or exceed the familiarity threshold, the system displays a message that asks the user whether the user likes the application. If the user likes the application, the system assists the user in rating the application. Otherwise, the system assists the user in providing feedback for the application.

20 Claims, 14 Drawing Sheets iOS Version: 9.1
Device Local: en_US
Device Name: iPhone OS
App Version: 0.0.33
Device Model: iPhone
Bundle Identifier: org.cocoapods.Rate Sent from my iPhone

FEEDBACK MANAGER FOR INTEGRATION WITH AN APPLICATION

BACKGROUND

Field

The disclosed embodiments relate to user feedback for a software program. More specifically, the disclosed embodiments relate to techniques for detecting a need for and obtaining user feedback and/or user ratings for a software application.

Related Art

When a user first installs a software application on an electronic device, the user may not possess the fluency needed to effectively use the application. Additionally, the user's lack of familiarity with the software application may cause the user to dislike and even reject the application, which may eventually lead the user to uninstall it from the electronic device before learning how to use it as intended. In some cases, users that are new to the software application may additionally possess valuable feedback on how to improve the software application. Without some encouragement however, most users may keep the feedback to themselves.

Hence, what is needed is a user rating handler that can detect a user's level of satisfaction and/or familiarity with a software application, and take an action that is appropriate for the detected level of familiarity.

BRIEF DESCRIPTION OF THE FIGURES

In the figures, like reference numerals refer to the same figure elements.

DETAILED DESCRIPTION

Figure 1:
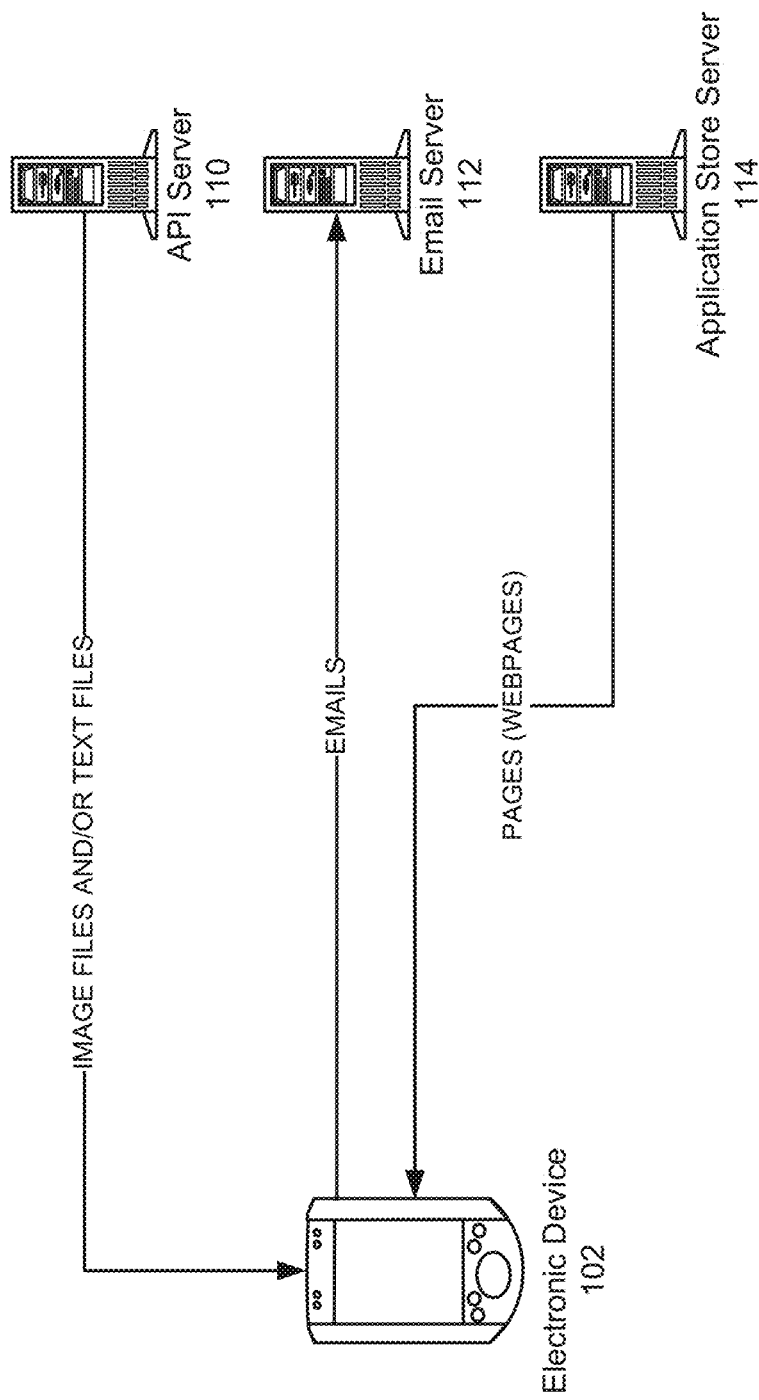
FIG. 1 shows a schematic of a system in accordance with the disclosed embodiments.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The disclosed embodiments provide a method, apparatus, and system for obtaining user ratings and/or feedback for a software application. More specifically, the disclosed embodiments provide a method, apparatus, and system for determining a user's level of satisfaction and/or familiarity with the application and, based on the determined level of satisfaction or familiarity, encourage the user to either rate the application or provide feedback. The disclosed embodiments are described as they may be implemented to reflect users' familiarity with the software application, but it should be understood that these and/or other embodiments may also or instead be implemented so as to reflect users' satisfaction with the application.

After a user installs an application on an electronic device, a feedback manager, which may exist as a third-party library within the application, may begin tracking a series of interactions between the user and the application. The feedback manager may associate certain interactions with the user having familiarity with the application and other interactions with the user being unfamiliar with the application (wherein the user may need guidance in using the application). If enough interactions that indicate familiarity are detected, the feedback manager may display a notification to the user that asks whether the user likes the application. If the user answers yes to this question, the feedback manager may display another notification that asks whether the user wants to rate the application. If the user also answers yes to this question, the feedback manager may forward the user to a website associated with the application that allows the user to rate the application.

On the other hand, if enough interactions that indicate a need for guidance and/or a likelihood of providing feedback are detected, the feedback manager may display a notification to the user that asks whether the user would like to send feedback about the application. If the user answers yes to this question, the feedback manager may display a feedback form to the user, thereby enabling the user to provide feedback to the application's developers. By encouraging users to provide feedback about the application when detecting unfamiliarity with the application, the feedback manager may increase the amount of meaningful user feedback given to the developers, thereby facilitating the developers in improving the application.

During operation, the feedback manager (i.e., the application that includes the feedback manager) may obtain files via fetch requests to a network manager, wherein a fetch request may be customized to obtain a file from the memory of the electronic device, the permanent store of the electronic device, and/or the Internet. In turn, the network manager may forward the request to a cache manager that may cache files of different types in separate caches. Additionally, the network manager may handle requests for files of different types in separate pipelines. By handling and storing different types of files separately from each other, the network manager and the cache manager may prevent large size files types from delaying and/or interfering with the retrieval and/or storage of smaller size files types.

FIG. 1 shows a schematic of a system in accordance with the disclosed embodiments. As shown in FIG. 1, while executing the software application, electronic device 102 may obtain image files and/or text files from application programming interface (API) server 110. When assisting the user in providing feedback to the developers of the application, electronic device 102 may transmit one or more emails containing feedback to email server 112. When facilitating the user in rating the application, electronic device 102 may request one or more pages (web pages) associated with the application from application store server 114.

Electronic device 102 may be a personal computer (PC), laptop computer, tablet computer, mobile phone, portable media player, workstation, gaming console, or other computing device that is capable of executing the application in one or more forms. Likewise, API server 110, feedback email server 112, and application store server 114 may include any node on a network (e.g., the Internet) whose task is to serve content to applications and/or web browsers running on remote electronic devices. Servers 110-114 can each participate in an advanced computing cluster or can act as a stand-alone server. In some embodiments, communications between electronic device 102 and servers 110-114 take place across the Internet.

Figure 2:
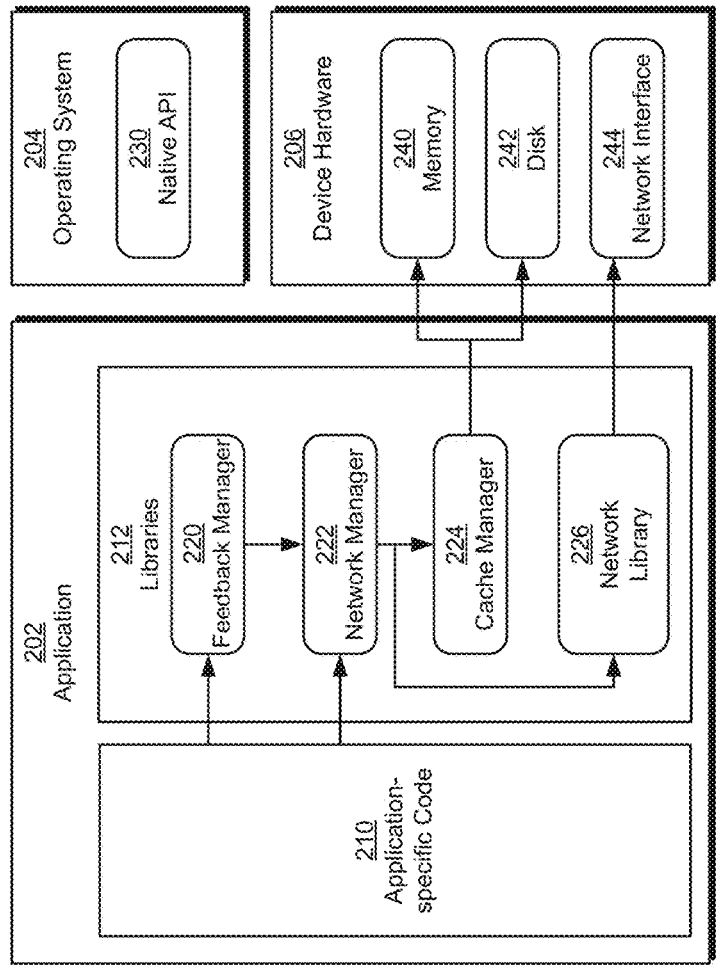
FIG. 2 shows a system for obtaining user ratings and/or feedback for an application in accordance with the disclosed embodiments.

FIG. 2 shows a system for obtaining user ratings and/or feedback in accordance with the disclosed embodiments. As shown in FIG. 2, application 202, which executes on top of operating system 204 and device hardware 206, may include application-specific code 210 and libraries 212, all of which may be contained within electronic device 102. Application 202 may be an application that executes on an operating system (e.g., operating system 204), an embedded application that executes on firmware, an enterprise application, and/or any other type of software program. Application 202 may be written in a high-level programming language that can be compiled into intermediate code and/or machine-level code via a compiler (e.g., C, C++, Objective-C, Java™ and/or Swift®). In embodiments where application 202 executes on top of operating system 204, operating system 204 may serve as an interface between application 202 and one or more components of device hardware 206. In particular, application 202 may make system calls to operating system 204 using native API 230 when it needs a system function to be performed (e.g., outputting text to a screen of the electronic device).

Hardware components included in device hardware 206, which application 202 may use for obtaining and/or storing files, include memory 240, disk 242, and network interface 244. Memory 240 may correspond to volatile dynamic random-access memory (DRAM) and/or any type of volatile memory that (1) serves as main memory, which is directly accessible from electronic device 102's processor and (2) relies on power to maintain stored information. Disk 242 may correspond to non-volatile flash memory, hard disk drives, floppy disks, magnetic tape, optical discs, and/or any type of non-volatile memory that (a) serves as mass storage for electronic device 102 and (b) can retrieve stored files even after having been power cycled.

In general, retrieving files from memory 240 may be faster than retrieving the same files from disk 242. Network interface 244 may correspond to an Ethernet interface, a Wi-Fi® radio interface, cellular network radio interface, a Bluetooth low energy® (BTLE) radio interface, and/or any other network interface capable of transmitting and receiving files from one or more networks (e.g., local area network (LAN), the Internet). In general, retrieving files from disk 242 may be faster than retrieving the same files from across the network using network interface 244.

Application 202 may include application-specific code 210 and libraries 212. Application-specific code 210 may correspond to one or more source code files that were written specifically to implement the logic and behavior of application 202. Libraries 212 may correspond to one or more (third-party) software libraries, which, in contrast to application-specific code 210, may not have been created specifically for application 202. In particular, libraries 212 may include feedback manager 220, network manager 222, cache manager 224, and/or network library 226.

Software libraries generally consist of pre-written frequently used routines that various developers may incorporate into their applications (e.g., static libraries, libraries provided by software development kits (SDKs), libraries provided by frameworks, Dynamic-link libraries, .dylib files, and/or CocoaPods®), wherein code written specifically for an application may call these routines during the execution of the application. Preparing application 202 for execution on electronic device 102 may include compiling application-specific code 210 and linking the compiled code to the libraries provided by libraries 212. In some embodiments, libraries included in libraries 212 may be dynamically linked to the compiled code. In some cases, the availability of third-party libraries for incorporation into different applications may promote code reuse. For example, feedback manager 220, network manager 222, cache manager 224, and network library 226 may each be available in a package form that can be readily obtained and incorporated into different applications by their respective developers.

As shown in FIG. 2, application-specific code 210 may depend on feedback manager 220 and network manager 222 (e.g., classes and/or functions within application-specific code 210 may reference/call classes and/or functions within feedback manager 220 and network manager 222). For example, the application-specific code may rely on feedback manager 220 to implement functionality for enabling a user to rate and/or provide feedback for application 202. Additionally, application-specific code 210 may rely on network manager 222 to retrieve files (e.g., image files and/or text files) from various sources (e.g., memory, disk, and/or remote sources such as the Internet). In turn, feedback manager 220 may rely on network manager 222 to retrieve files from the same sources. Network manager 222 may rely on (1) cache manager 224 when handling fetch requests that include memory and/or disk and (2) network library 226 when handling fetch requests that include remote sources (e.g., the Internet). Cache manager 224 may depend on memory 240 and disk 242 to store files retrieved from remote sources. Network library 226 may rely on network interface 244 to retrieve files from remote sources. The feedback manager, the network manager, and the cache manager are discussed in separate sections below.

Feedback Manager

Figure 3A:
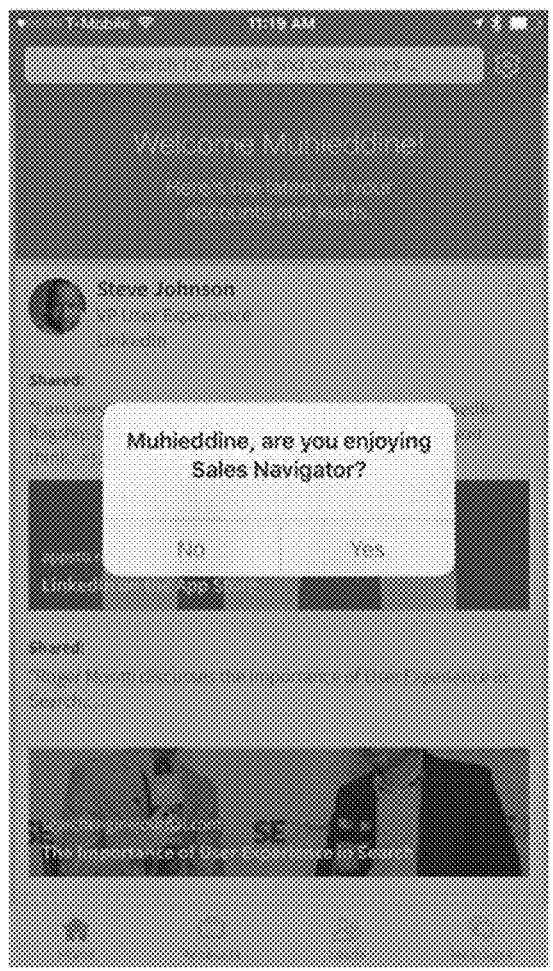
FIGS. 3A-3C show screen shots of a graphical user interface (GUI) in accordance with the disclosed embodiments.
Figure 3B:
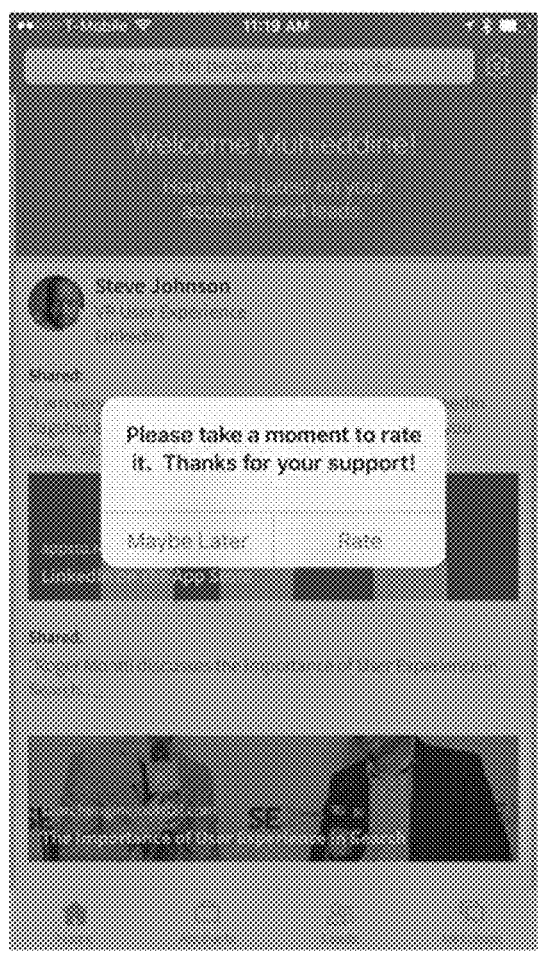
Figure 3C:

FIGS. 3A-3C show screen shots of a graphical user interface (GUI) in accordance with the disclosed embodiments. FIG. 3A displays an example screenshot of a notification (i.e., a message) asking the user of application 202 whether the user likes the application. As shown in FIG. 3A, the notification may also include a "Yes" button that the user can press to confirm that the user likes the application and a "No" button that the user can press to confirm that the user dislikes the application. FIG. 3B displays an example screenshot of a notification asking whether the user wants to rate application 202. As shown in FIG. 3B, the notification may also include a "Rate" button that the user can press to indicate that the user wants to rate the application and a "Maybe Later" button that the user can press to indicate that the user does not want to rate the application right now. FIG. 3C displays an example screenshot of a form that enables the user to provide feedback about application 202 to the application's developers. As shown in FIG. 3C, the feedback form may include a text box and/or other GUI components that enable the user to provide (e.g., type, write, vocalize) feedback about the application (e.g., explain why the user is dissatisfied with the application) and a "Send" button that the user can press, after completing the form, to send an email containing the feedback to the developers.

It should be noted that any of these notifications and/or forms may be displayed using various user-interface (UI) elements (e.g., a dialog box, a popup notification, a window of the application) that are available to application 202. In some embodiments, each of the notifications and/or forms may be displayed as a separate window that covers electronic device 102's screen entirely. In some embodiments, each of the notifications and/or forms may be displayed within a graphical component that is shown alongside and/or on top of one or more other graphical components that display information specific to the application. In some embodiments, each of the notifications and/or forms may display a username of the user, which may have been obtained earlier when the user performed a login sequence within application 202.

It should be noted that developers of application 202 may customize and or configure the notifications and/or forms displayed by feedback manager 220 by editing a configuration file (e.g., Extensible Markup Language (XML) file, JavaScript Object Notation (JSON) .plist file) associated with feedback manager 220. By editing the configuration file, the user may customize (1) the text (e.g., "OK" button text, "Cancel" button text) displayed in each of the notifications and/or forms and (2) the appearances of each of the notifications and/or forms. In some embodiments, these notifications and/or forms may be localized.

In some embodiments, feedback manager 220 may provide hooks (e.g., call-back functions) that allow application-specific code 210 to handle the display of each of the notifications and/or forms using the application's custom UI.

Figure 4:
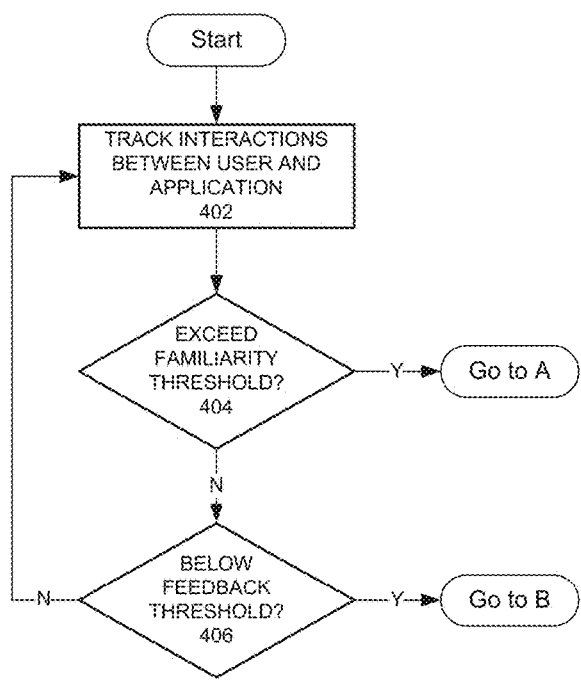
FIGS. 4-5 show a series of flowcharts illustrating an exemplary process of obtaining user ratings and/or feedback in accordance with the disclosed embodiments.
Figure 5:
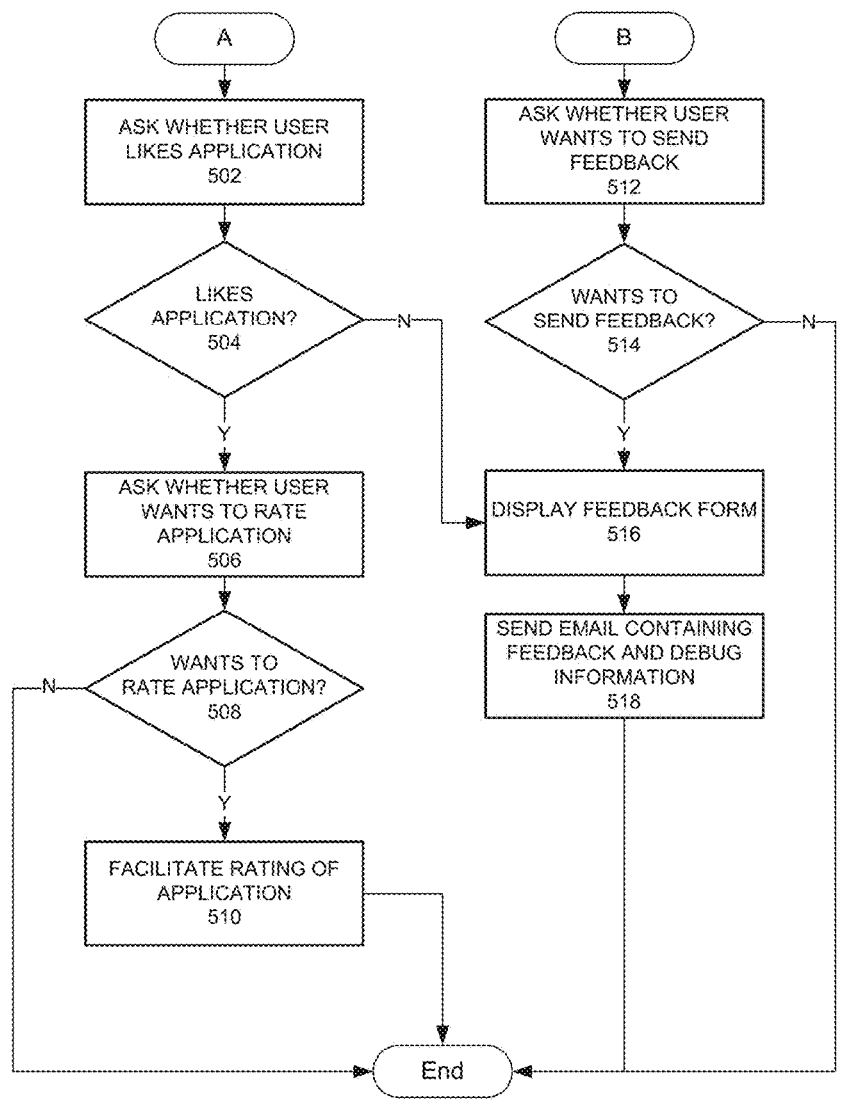

FIGS. 4-5 show a series of flowcharts illustrating an exemplary process of obtaining user ratings and/or feedback in accordance with the disclosed embodiments. In one or more embodiments, one or more of the steps may be omitted, repeated, and/or performed in a different order. Accordingly, the specific arrangement of steps shown in FIGS. 4-5 should not be construed as limiting the scope of the embodiments.

As shown in FIGS. 4-5, while the user uses application 202 on electronic device 102, feedback manager 220 may track one or more interactions between the user and the application (operation 402). While tracking the one or more interactions, feedback manager 220 (i.e., the logic within the feedback manager library, which is compiled and/or linked into application 202) may periodically determine whether the interactions meet or exceed a familiarity threshold (decision 404) or a feedback threshold (decision 406).

Interactions between the user and the application may correspond to input from the user (e.g., touch screen input, keyboard input, mouse input, vocal input, motion input) to the application. Examples of interactions include opening the application, opening a content item (e.g., an article, an image, a podcast, a job posting, a user profile) within the application, swiping to a next content item, liking a content item, sharing a content item, commenting on a content item, and closing/dismissing a content item.

Additionally, interactions may be categorized into interactions that indicate familiarity and interactions that indicate a need for guidance and/or a likelihood of obtaining feedback. An interaction, which occurs between the user and the application, that indicates familiarity may further indicate that the user likes and/or is familiar with the application or some aspect of the application and/or is more likely than not to provide an informed rating for the application based on the user's familiarity towards the application. For example, sharing a content item with another user may indicate that the user is actively using various features of the application, which in turn may indicate that the user likes and/or is familiar with the application. An interaction, which occurs between a user and the application, that indicates a need for guidance and/or a likelihood of providing feedback may further indicate that the use dislikes and/or is unfamiliar with the application and/or some aspect of the application and/or is more likely than not to provide feedback on the application based on the user's dislike and/or unfamiliarity towards the application. For example, dismissing a content item a short time (e.g., within one second) after loading it may indicate that the user is disinterested in the content item, which in turn may indicate that the user dislikes and/or is unfamiliar with the application.

In some embodiments, tracking interactions may involve tracking how often a specific type of interaction occurs. In particular, feedback manager 220 may keep track of how often the user opens (i.e., initiates the execution of) the application within a certain time span (e.g., per hour, per day, per week) over an equal or longer time span (e.g., over three hours, over six days, over two weeks). For example, the familiarity threshold may correspond to the user opening the application at least twice a week over three weeks while the feedback threshold may correspond to the user opening the application equal to or less than once every two weeks for four weeks. Here, if the user continues to open the application every day, the feedback manager may eventually determine that the interactions between the user and application 220 exceed the familiarity threshold. On the other hand, if the user opens the application only once a month, the feedback manager may eventually determine that the interactions fall below a feedback threshold (which is a threshold with a negative value).

In some embodiments, tracking interactions may involve a point tracking system that gathers metrics from multiple types of interactions. In particular, feedback manager 220 may maintain a point score that increases each time an interaction that indicates familiarity occurs and decreases each time an interaction that indicates a need for guidance and/or a likelihood of providing feedback occurs. For example, the point score associated with the user and application 202 may initially be at zero. When the user opens a content item within the application and views it for at least ten seconds, feedback manager 220 may interpret this interaction as positive and add a point to the point score. When the user opens a subsequent content item and dismisses it within one second, feedback manager 220 may interpret this interaction as negative and subtract a point from the point score. If the user then opens yet another content item and posts a comment about the content item in the comment section, feedback manager 220 may interpret this interaction as positive and add another point to the point score.

In these embodiments, the familiarity threshold may correspond to a positive score that is achieved within a certain time frame while the feedback threshold may correspond to a negative score achieved within a certain time frame, which may or may not be the same time frame used for the familiarity threshold. For example, if the point score reaches seven points within a week (because the user had seven interactions that indicate familiarity with the application during that week), feedback manager 220 may determine that the interactions have exceeded the familiarity threshold. On the other hand, if the point score reaches negative seven points within a week (because the user had seven interactions that indicate a need for guidance and/or a likelihood of providing feedback with the application during that week), feedback manager 220 may determine that the interactions have fallen below the feedback threshold.

In some embodiments, the feedback manager may reset the point score (1) after a time frame (e.g., a week) has passed, (2) when the user logs out of the application, and/or (3) when the user upgrades the application. In another embodiment, the feedback manager may incrementally adjust the point score back to zero as the time period progresses (e.g., if the point score is positive, subtracting a point for each passing day; if the point score is negative, adding a point for each passing day). In some embodiments, feedback manager 220 may assign different point values to different types of interactions (e.g., adding a single point each time the user opens a content item but adding three points each time the user shares a content item with another user).

With reference now to FIG. 5, if the interactions meet or exceed the familiarity threshold, feedback manager 220 may display a notification asking whether the user likes the application (operation 502). Here, the user may confirm that she likes the application by pressing an "OK" button or indicate that she does not like the application by pressing a "Cancel" button. If the user confirms that she likes the application (decision 504), feedback manager 220 may then display a subsequent notification asking whether the user wants to rate the application (operation 506). Here, the user may indicate that she wants to rate the application by pressing an "OK" button or that she does not want to rate the application by pressing a "Cancel" button.

If the user indicates that she wants to rate the application (decision 508), feedback manager 220 may facilitate, for the user, the process of rating application 202 (operation 510). In some embodiments, to facilitate the process of rating the application, feedback manager 220 may invoke a browser and/or an application store (e.g., App Store®, Google Play®), that is provided by operating system 204, wherein the browser requests a page (web page) that is associated with application 202 from application store server 114. In some embodiments, the page may be presented to the user from within application 202. The page may include a section for rating application 202. In some embodiments, a rating for an application may correspond to a score (e.g., 4.5 stars out of five stars, 7.3 out of a maximum score of ten).

Returning to decision 504, if the user indicates that she does not like the application, feedback manager 220 may display a feedback form that allows the user to write feedback about the application. If the user provides feedback, the feedback manager may then send an email including the feedback and debug information to email server 112. In some embodiments, the debug information may include information about the current user session between the user and application 202. In particular, the debug information may include electronic device 102's model name and/or number, the device's cellular carrier (i.e., wireless carrier, mobile network operator), locale (e.g., en_US), operating system (e.g., Android®, iOS®), application version, operating system version, and other information that can be injected into the email by application 202. In some embodiments, the feedback form may be presented by an email client installed in operating system 204 and/or a web email client provided by a remote server.

After receiving the email, developers of application 202 may use the debug information and feedback provided by the user to fix bugs within application 202, improve features that were identified to be deficient within the application, and/or add requested features to the application. With the feedback information, the developers may make improvements that are more relevant more quickly to application 202, which may result in higher ratings for the application, which in turn may spur more prospective users to install the application in their electronic devices. In some cases where feedback from the user can be addressed with guidance on using the application, an email containing guidance can be sent back to the user. As a result, the user may become more competent at using the application.

Returning to FIG. 4, while the user uses application 202, feedback manager 220 may periodically determine whether the interactions fall below a feedback threshold (decision 406). If the interactions fall below the feedback threshold, feedback manager 220 may display a notification asking whether the user wants to send feedback about application 202 to the developers (operation 512). Here, the user may indicate that she wants to send feedback by pressing an "OK" button or that she does not want to send feedback by pressing a "Cancel" button. If the user indicates that she wants to send feedback (decision 514), feedback manager 220 may display the feedback form (operation 516). After the user provides her feedback to the feedback form, feedback manager 220 may send an email containing the feedback and the debug information to email server 112.

In some embodiments, feedback manager 220 may focus on tracking interactions between the user and a specific feature of application 202 to determine the user's level of satisfaction towards the specific feature. In some cases, the feature may be a new feature that was added to application 202 after an update to the application. To enable feedback manager 220 to determine when the new feature is used, feedback manager 220 may provide one or more callback functions to application-specific code 210. Developers may then modify application-specific code 210 to call the callback functions when relevant interactions between the user and the specific feature occur. For example, if application 202 has been recently updated to recognize Force Touch® input, application-specific code 210 may call the call-back functions when Force Touch-related event handlers are invoked within application 202. When a call-back function is called, feedback manager 220 may respond by tracking the interaction passed via the call-back function (e.g., by adding a point for a positive Force Touch interaction and subtracting a point for a Force Touch interaction that indicates unfamiliarity with the feature).

Additionally, by editing the configuration file associated with feedback manager 220, developers of application 202 may tailor the notifications and/or forms displayed by feedback manager 220 to focus on the specific feature. In particular, the developers may provide a keyword or phrase (e.g., "Force Touch") via the configuration file. When displaying the notifications and/or forms to the user, feedback manager 220 may display the keyword or phrase. For example, if the feedback manager detects that the user has used the Force Touch feature seven times within the past week, the feedback manager may display a notification asking whether the user likes the "Force Touch" feature. If the user confirms that she likes the feature, the feedback manager may then proceed to ask whether the user wants to rate the application.

Additionally, feedback manager 220 may track interactions with different features (including the application in general) simultaneously. Here, developers of the application may provide the feedback manager with a keyword or phrase for each feature being tracked (the application in general may not need a keyword or phrase). Moreover, familiarity thresholds and feedback thresholds associated with each feature (and the application in general) may vary (e.g., seven interactions that indicate familiarity per week is the familiarity threshold for the Force Touch feature while five interactions that indicate familiarity every two weeks is the familiarity threshold for the application in general). Furthermore, feedback provided by the user for each specific feature may be sent to different email addresses and/or different email servers.

Network Manager and Cache Manager

In general, applications that run on electronic devices (e.g., application 202) may need to fetch different types of files from remote sources on the Internet, such as API servers (e.g., API Server 110) in order to execute properly. These files may differ in size, with certain file types (e.g., image files, audio files, video files) corresponding to files that are generally much larger than those that correspond to other file types (e.g., text files, HyperText Markup Language (HTML) files, XML files, JSON files). In some cases, fetching and/or loading an image file, which contains digital image data (e.g., pixels), from memory (e.g., memory 240), disk (e.g., disk 242), and/or the Internet (via network interface 244), may disproportionately delay the fetching and/or loading of one or more smaller text files (e.g., one or more JSON files), which contain textual data (e.g., JavaScript code) in a particular character encoding (e.g., Latin-1, a Unicode Transformation Format (UTF) encoding, American Standard Code for Information Interchange (ASCII)).

Thus, the network manager (e.g., network manager 222) and the cache manager (e.g., cache manager 224) may handle a fetch request differently based on the type of the file being fetched. More specifically, the network manager and the cache manager may handle fetch requests for image files (e.g., Joint Photographic Experts Group (JPEG) files, Portable Network Graphics (PNG) files, BMP (bitmap) files, GIF files) and fetch requests for text files (e.g., JSON files) with different queues. In doing so, the network manager and the cache manager may reduce the time it takes on average to fetch text files for the application. Additionally, the cache manager may store image files and text files in separate cache layers. By keeping the larger image files in one or more separate cache layers, cache manager 224 may be able to cache a larger number of smaller text files, thereby further reducing the time it takes on average to fetch text files for the application.

Figure 6:
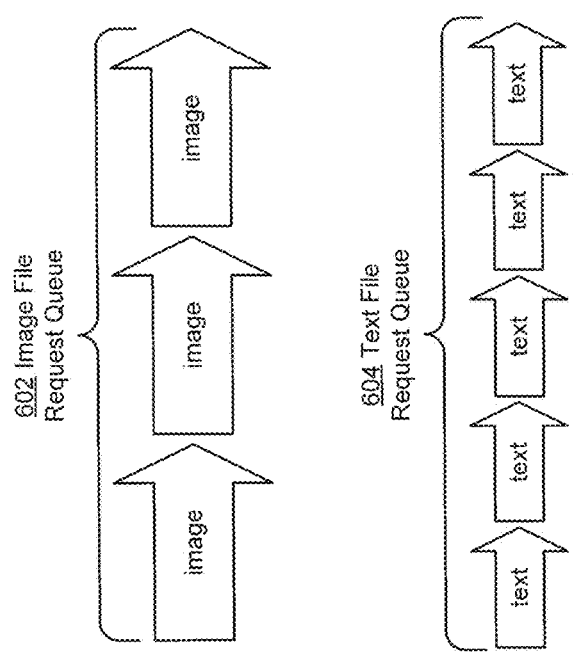
FIG. 6 shows an image queue and a text file queue in accordance with the disclosed embodiments.

FIG. 6 shows an image file queue and a text file queue in accordance with the disclosed embodiments. Image file request queue 602 may correspond to one or more queue data structures used to queue fetch requests for image files. Text file request queue 604 may correspond to one or more other queue data structures used to queue fetch requests for text files.

As shown in FIG. 6, image file request queue 602 has three image file fetch requests (each image file fetch request is represented by an arrow containing the word "image"), queued while text file request queue 604 has five text file fetch requests (each text file fetch request is represented by an arrow containing the word "text") queued. Additionally, the larger size of the image arrows as compared to the text arrows represents the fact that, because image files are on average larger than text files, it takes longer to download an image file from the Internet and/or load the image file from the cache than to download a text file from the Internet and/or load the text file from the cache respectively. By keeping fetch requests for image files in queue 602 and fetch requests for text files in queue 604, the network manager and/or the cache manager may reduce the time it takes to fetch text files for the application, which may in turn improve the application's performance.

In some embodiments, entries within image file request queue 602 may be handled asynchronously (i.e., having the main thread of the application (1) spawn an additional thread, (2) hand the fetch request to the spawned thread, and (3) continue executing the application without waiting for the spawned thread to finish the fetch request) while entries within text file request queue 604 may be handled synchronously (i.e., having the main thread of the application execute the fetch request without spawning an additional thread). By doing this, the application's execution won't have to halt and wait each time an image file is being loaded. In some embodiments, entries within both image file request queue 602 and text file request queue 604 may be handled asynchronously.

Figure 7:
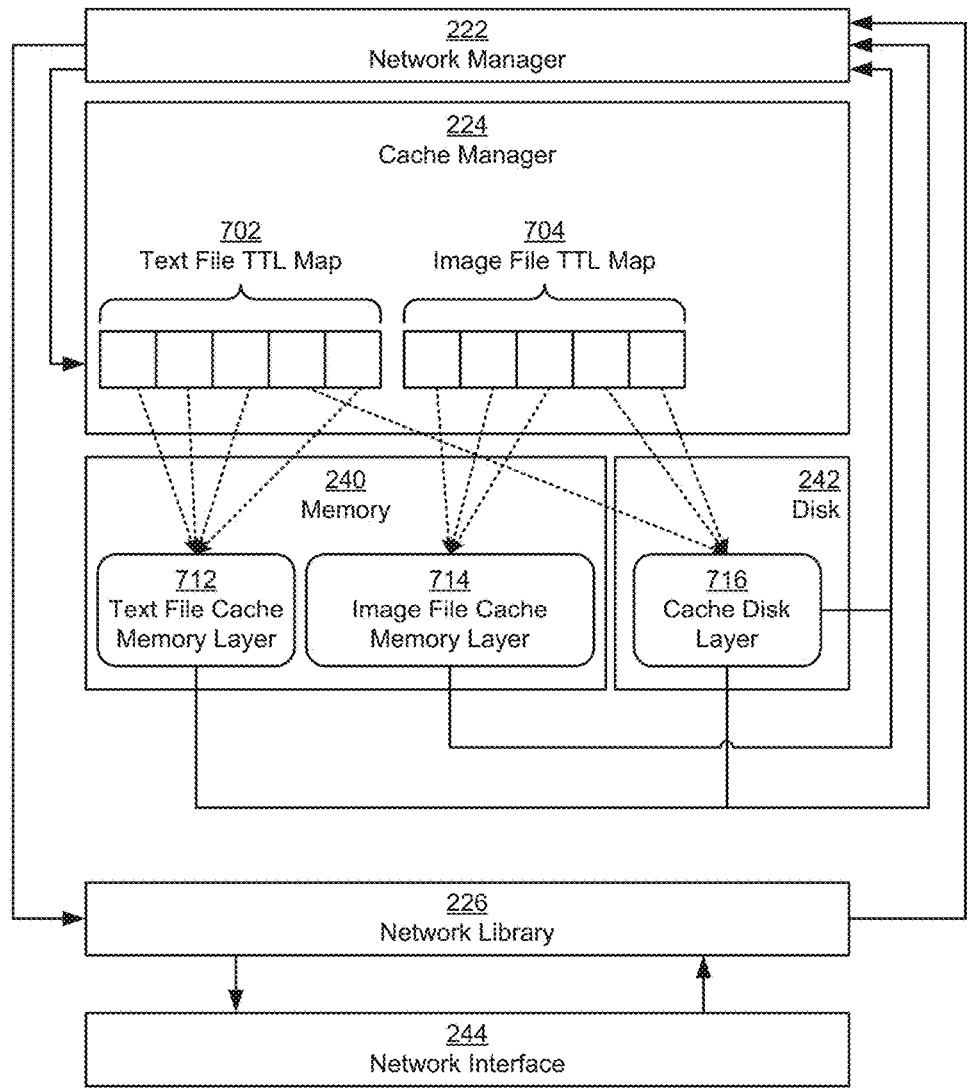
FIG. 7 shows a network manager and a cache manager in accordance with the disclosed embodiments.

FIG. 7 shows a network manager and a cache manager in accordance with the disclosed embodiments. In particular, network manager 222 may receive one or more fetch requests from one or more requesters (i.e., functions and objects within other components of application 202 that make calls to network manager 222 to fetch a file).

A fetch request for a file may include (1) parameters related to the file and (2) parameters related to how the network manager is to search for the file. The fetch request may include a Uniform Resource Locator (URL) that corresponds to the location in the Internet where the file can be downloaded. In some embodiments, the network manager may automatically append a root path to the beginning of a URL of the fetch request (e.g., append the root path "https://domain.com/" to the partial URL "path/to/file.json") if the URL is a partial URL. Here, different root paths may be specified for text files and image files within a configuration file for network manager 222. Additionally, the network manager may refrain from appending the root path to full URLs.

The fetch request may also specify a combination and/or sequence of sources (e.g., the Internet only, memory and disk only, memory and the Internet only, all sources) from which network manager 222 is to retrieve the file. For example, if a fetch request for a file specifies the sources memory and the Internet, then network manager 222 may attempt to obtain the file from (1) memory 240 using cache manager 224, and, if the file is not found in memory 240, from (2) the Internet by forwarding the URL to network library 226. In turn, network library 226 may use network interface 244 to download the file from the URL.

The ability to specify, within a fetch request, various combinations of sources from which to retrieve a file may be useful in various situations. For example, if an application wishes to retrieve the newest version of a file, the application may specify only the Internet within the fetch request. In another example, if the user is quickly browsing through multiple content items that contain image files within a short period of time, when obtaining these image files via fetch requests, the application may specify only memory 240 within the fetch requests to pursue only image files that can be quickly retrieved.

The fetch request may specify the file type of the file being requested. If the file type is an image file type, the fetch request may be handled asynchronously by the network manager and/or the cache manager. If the file type is a text file type, the fetch request may be handled synchronously or asynchronously by the network manager and/or the cache manager.

As shown in FIG. 7, cache manager 224 may receive, from network manager 222, one or more fetch requests that specify memory 240 and/or disk 242. Cache manager 224 may include two time-to-live (TTL) maps: text file TTL map 702 and image file TTL map 704. Additionally, cache manager 224 may maintain, within memory 240, a cache memory layer that may include text file cache memory layer 712 and image file cache memory layer 714, and, within disk 242, a cache disk layer that may include cache disk layer 716.

Cache manager 224 may use the cache memory layer and/or the cache disk layer to cache files that are downloaded from the Internet. By caching these files, cache manager 224 may enable these files to be loaded relatively quickly from memory 240 and/or disk 242 at a future time. In particular, loading a file cached in the cache memory layer may be even faster than loading a file cached in the cache disk layer. However, because the sizes of memory 240 and disk 242 may be constrained by device hardware 206, cache manager 224 may be able to cache a limited number of files within the cache memory layer and the cache disk layer. Thus, cache manager 224 may split the cache memory layer into text file cache memory layer 712, which caches text files, and image file cache memory layer 714, which caches image files. In some embodiments, cache manager 224 may split cache disk layer 716 into a text file (e.g., JSON file) cache disk layer and an image file cache disk layer.

Because text files (e.g., JSON files) are generally smaller than image files, by caching text files and image files in separate cache layers, cache manager 224 may be able to provide more cache entries (i.e., cache buckets) for text files and/or reduce the rate at which text files are evicted from cache layers. In particular, text file cache memory layer 712 may have more entries for caching text files than image file cache memory layer 714 has for caching image files. As a result, text files requested by application 202 may need to be downloaded less often, thereby improving the performance of application 202.

Cache manager 224 may use text file TTL map 702 and/or image file TTL map 704 to determine the staleness of files cached within cache layers 712-716. In particular, each entry within text file TTL map 702 may contain a mapping between a TTL (i.e., a numerical value that defines a length of time a cache entry is not stale, such as a second, a minute, 15 minutes, an hour, a day, a week, a year) and a text file cached within an entry of text file cache memory layer 712 or cache disk layer 716.

Similarly, each entry within image file TTL map 704 may contain a mapping between a TTL and an image file cached within an entry of image file cache memory layer 714 or cache disk layer 716. When a text file is downloaded by network library 226, cache manager 224 may cache the file within text file cache memory layer 712 or, if free memory is scarce, cache disk layer 716. Cache manager 224 may then create an entry in text file TTL map 702 that maps a TTL to the cache entry where the text file is cached. When an image file is downloaded by network library 226, cache manager 224 may cache the file within image file cache memory layer 714 or, if free memory is scarce, cache disk layer 716. Cache manager 224 may then create an entry in image file TTL map 704 that maps a TTL to the cache entry where the image file is cached.

In some embodiments, cache manager 224 may periodically perform self-eviction on the cache memory layer and/or the cache disk layer. In particular, when a cache layer's occupancy reaches a certain threshold (e.g., 70% full, wherein the cache layer's size is 100 megabytes (MB) and only 30 MB are free), the cache manager may compare the age of each cached file in the cache layer to their respective TTLs and clean out any stale files to free up space. In some embodiments, the cache manager may clean some or all of the cache layers when the application is invoked and/or when the user logs out of the application.

Figure 8:
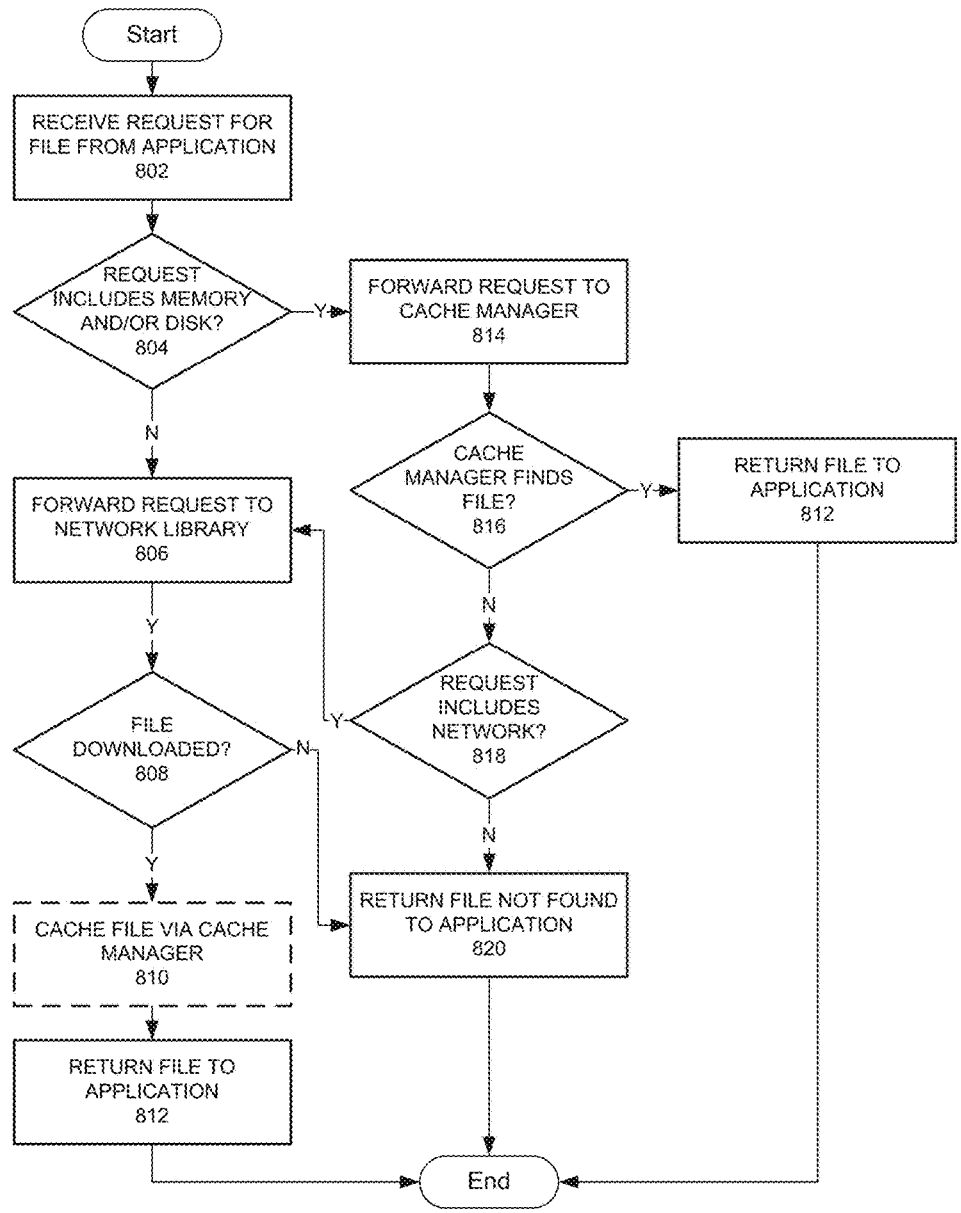
FIG. 8 shows a flowchart illustrating an exemplary process of fetching a file with the network manager in accordance with the disclosed embodiments.

FIG. 8 shows a flowchart illustrating an exemplary process of fetching a file with the network manager, in accordance with the disclosed embodiments. In one or more embodiments, one or more of the steps may be omitted, repeated, and/or performed in a different order. Accordingly, the specific arrangement of steps shown in FIG. 8 should not be construed as limiting the scope of the embodiments.

As shown in FIG. 8, while the user uses application 202 on electronic device 102, network manager 222 may receive a fetch request for a file from application 202 (operation 802). If the fetch request specifies that the cache memory layer and/or the cache disk layer should be checked for the file (decision 804), network manager may forward the request to cache manager 224 (operation 814). If cache manager 224 finds the file in one of its cache layers (decision 816), network manager 222 returns the file to application 202 (operation 812).

If cache manager 224 does not find the file (decision 816), network manager 222 determines whether the fetch request specifies that the file should be retrieved from the Internet (decision 818). If not, the network manager informs the application that the file was not found (operation 820). Otherwise, the network manager forwards the request to network library 226 (operation 806), thereby enabling network library 226 to download the file from the URL specified in the fetch request. If the networking library is not able to download the file from the URL (decision 808), the network manager informs the application that the file was not found (operation 820). Otherwise, network manager 222 may optionally have cache manager 224 cache the downloaded file (operation 810). Afterwards, network manager 222 may return the file to application 202 (operation 812).

It should be noted that the fetch request received in operation 802 may be queued in image file request queue 602 if the fetch request is for an image file and in text file request queue 604 if the fetch request is for a text file.

Figure 9:
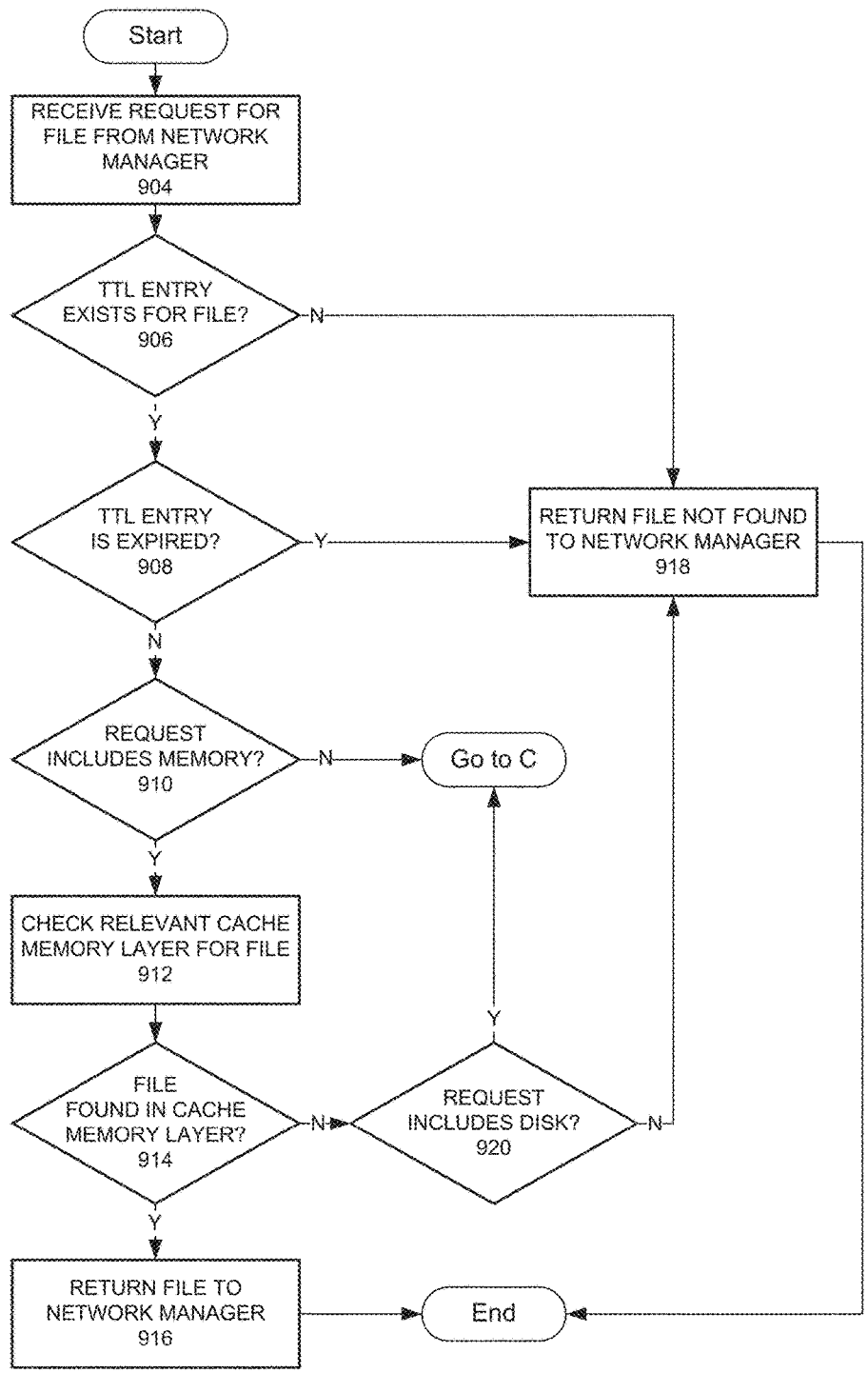
FIG. 9-10 shows a flowchart illustrating an exemplary process of fetching a file with the cache manager in accordance with the disclosed embodiments.
Figure 10:
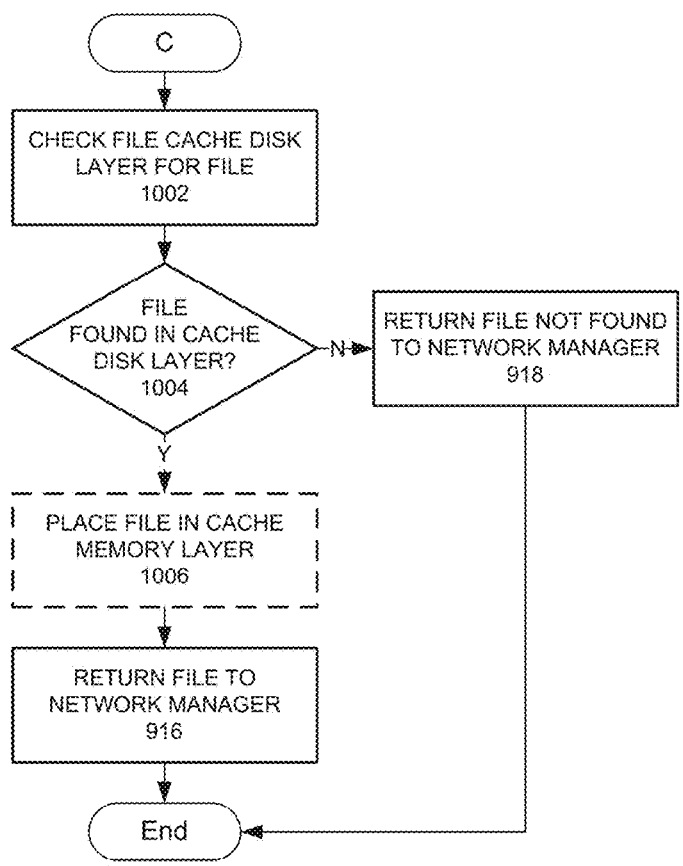

FIGS. 9-10 show a flowchart illustrating an exemplary process of fetching a file with the cache manager in accordance with the disclosed embodiments. In one or more embodiments, one or more of the steps may be omitted, repeated, and/or performed in a different order. Accordingly, the specific arrangement of steps shown in FIGS. 9-10 should not be construed as limiting the scope of the embodiments.

As shown in FIGS. 9-10, cache manager 224 may receive a fetch request for a file that is forwarded from network manager 222 (operation 904), wherein the fetch request specifies that the cache memory layer and/or the cache disk layer should be checked for the file. Next, cache manager 224 may check a TTL map to determine whether the file is cached (decision 906). In particular, the cache manager may search for a TTL entry within the TTL map using the file's URL as a key. Here, cache manager 224 may search text file TTL map 702 if the fetch request is for a text file and image file TTL map 704 if the fetch request is for an image file. If a TTL entry that corresponds to the URL is not found within the relevant TTL map, cache manager 224 may inform network manager 222 that the file was not found within the cache (operation 918).

If a TTL entry that corresponds to the URL is found within the relevant TTL map, cache manager 224 may check whether the TTL is unexpired (decision 908). For example, if a file's TTL is equal to 12 hours and more than a day has passed since the file was cached, the TTL is expired. If the TTL is expired, cache manager 224 may inform network manager 222 that the file was not found within the cache (operation 918). Here, checking the TTL map first to determine whether the TTL is expired may be advantageous because doing so may avoid having to load the cached file from disk to check the file's staleness, which would otherwise be expensive.

If the TTL is not expired, cache manager 224 may attempt to load the file from one of the cache layers. In particular, if the fetch request specifies that the cache memory layer is to be checked (decision 910), cache manager 224 may check the relevant cache memory layer (e.g., text file cache memory layer 712 if the file is a text file and image file cache memory layer 714 if the file is an image file) for the file (operation 912). If the file is found in the relevant cache memory layer (decision 914), cache manager 224 may return the file to network manager 222 (operation 916). If the file is not found in the relevant cache memory layer and the request does not specify that the cache disk layer is to be checked (decision 920), cache manager 224 may inform network manager 222 that the file was not found within the cache (operation 918).

If the request does specify that the cache disk layer is to be checked (decision 920), cache manager 224 may check cache disk layer 716 for the file (operation 1002). If the file is also not found in cache disk layer 716 (decision 1004), cache manager 224 may inform network manager 222 that the file was not found within the cache (operation 918). If the file is found in cache disk layer 716, cache manager 224 may return the file to network manager 222 (operation 916). In some embodiments, cache manager 224 may also place the file in the relevant cache memory layer so that the file can be more quickly retrieved in the future (operation 1006).

Figure 11:
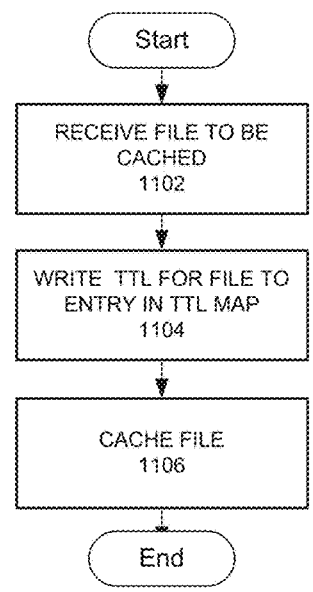
FIG. 11 shows a flowchart illustrating an exemplary process of caching a file in accordance with the disclosed embodiments.

FIG. 11 shows a flowchart illustrating an exemplary process of caching a file in accordance with the disclosed embodiments. In one or more embodiments, one or more of the steps may be omitted, repeated, and/or performed in a different order. Accordingly, the specific arrangement of steps shown in FIG. 11 should not be construed as limiting the scope of the embodiments.

As shown in FIG. 11, once network manager 222 has downloaded a file from the Internet, it may forward the file to cache manager 224 to have it cached for future use (operation 1102). Cache manager 224 may write a TTL to an entry within the TTL map that corresponds to the downloaded file's type (text file TTL map 702 if the file is a text file and image file TTL map 704 if the file is an image file), wherein the entry that is written to corresponds to the URL from which the file was downloaded (operation 1104). Next, cache manager 224 may cache the file in an entry of one of the cache layers (operation 1106) and write the address of the file's cache entry to the file's TTL entry. In some embodiments, cache manager 224 may initially attempt to cache the file in the relevant cache memory layer (e.g., text file cache memory layer 712 if the file is a text file and image file cache memory layer 714 if the file is an image file). If the relevant cache memory layer does not have enough space for caching the file, the cache manager may instead cache the file in cache disk layer 716.

In some embodiments, a fetch request may specify one or more post-processing operations to be applied to an image file after it is obtained (e.g., downloaded from the Internet). These post-processing operations may be represented in the fetch request as call-back functions. After the image file is downloaded from the URL, the network manager may apply each of the post-processing operations on the image file (by passing the image file to the call-back function that corresponds to the post-processing operation and receiving, from the call-back function, the image file that has been modified by the call-back function), resulting in a post-processed image file. Additionally, an image identifier may be assigned to the post-processed image file, wherein the image identifier is used instead of the image file's URL as the key for accessing the post-processed image file from the cache layers. It should be noted that an image file that has a particular set of post-processing operations applied to it may be assigned a particular image identifier that is unique to the image file and the particular set of post-processing operations. Thus, the same image file that has a different set of post-processing operations applied to it may be assigned an image identifier that is different from the particular image identifier. In doing so, image files with various sets of post-processing operations applied to them may be stored in and later retrieved from the cache layers, thereby reducing the need to reapply post-processing operations to image files that are downloaded from the Internet.

Figure 12:
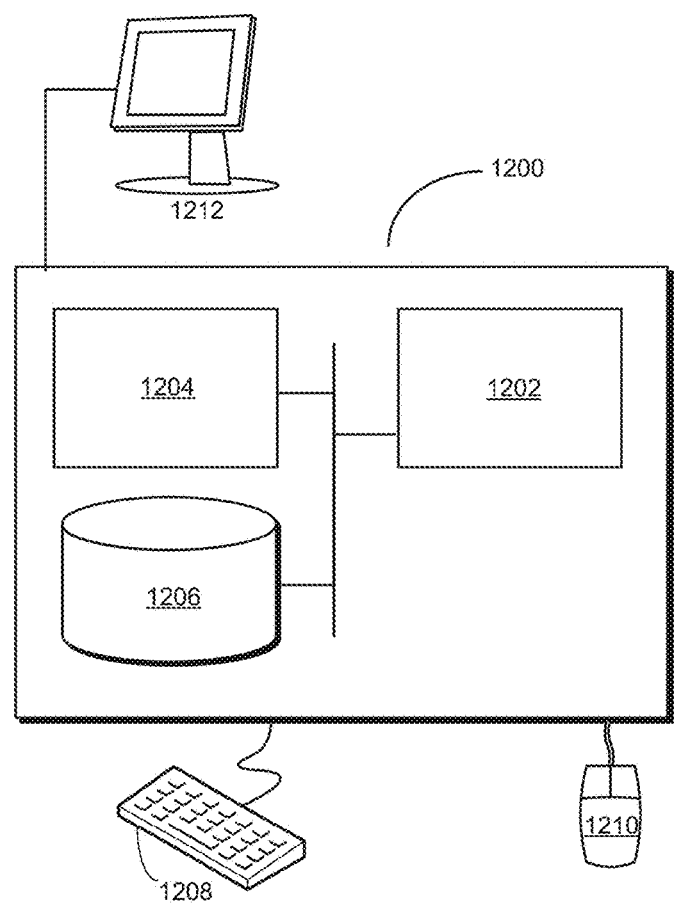
FIG. 12 shows a computer system in accordance with the disclosed embodiments.

FIG. 12 shows a computer system 1200 in accordance with an embodiment. Computer system 1200 may correspond to an apparatus that includes a processor 1202, memory 1204, storage 1206, and/or other components found in electronic computing devices such as personal computers, laptop computers, workstations, servers, mobile phones, tablet computers, and/or portable media players. Processor 1202 may support parallel processing and/or multi-threaded operation with other processors in computer system 1200. Computer system 1200 may also include input/output (I/O) devices such as a keyboard 1208, a mouse 1210, and a display 1212.

Computer system 1200 may include functionality to execute various components of the present embodiments. In particular, computer system 1200 may include an operating system (not shown) that coordinates the use of hardware and software resources on computer system 1200, as well as one or more applications that perform specialized tasks for the user. To perform tasks for the user, applications may obtain the use of hardware resources on computer system 1200 from the operating system, as well as interact with the user through a hardware and/or software linker provided by the operating system.

In one or more embodiments, computer system 1200 provides a system for determining a user's level of satisfaction towards an application and, based on the determined level of satisfaction, encourage the user to either rate the application or provide feedback. The system may include a network manager apparatus that may receive a fetch request for a file from the application and, based on the fetch request, check the memory, disk, and/or the Internet for the file. The system may also include a cache manager mechanism that may handle different types of data separately from each other to prevent large sized data types from delaying and/or interfering with the retrieval and/or storage of small sized data types.

In addition, one or more components of computer system 1200 may be remotely located and connected to the other components over a network. Portions of the present embodiments (e.g., storage apparatus, extraction apparatus, etc.) may also be located on different nodes of a distributed system that implements the embodiments. For example, the present embodiments may be implemented using a cloud computing system that improves the knowledge and management of memory consumption in a set of remote software programs.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method for obtaining user feedback for an application, the method comprising:
   tracking, over a specified time period, multiple interactions between a user and one or more features of the application that indicate that the user has familiarity with the application or is unfamiliar with the application, wherein tracking the interactions comprises keeping a score that is increased when an interaction that indicates that the user has familiarity with the application occurs and decreased when an interaction that indicates that the user is unfamiliar with the application occurs, and wherein the application is configured to execute on an electronic device;
   determining, based on the score, whether the interactions meet or exceed a familiarity threshold; and
   when the interactions meet or exceed the familiarity threshold:
      displaying a message that asks the user whether the user likes the application;
      if the user answers in the affirmative to the message that asks the user whether the user likes the application, assisting the user in rating the application; and
      if the user answers in the negative to the message that asks the user whether the user likes the application, assisting the user in providing feedback for the application.

2. The computer-implemented method of claim 1, further comprising:
   while tracking the interactions, determining whether the interactions fall below a feedback threshold, wherein being below the feedback threshold indicates that the user would be more likely than not to provide feedback for the application; and
   if the user interactions fall below the feedback threshold, causing the application to assist the user in providing feedback for the application.

3. The computer-implemented method of claim 1, wherein assisting the user in rating the application comprises:
   displaying a message that asks whether the user wants to rate the application; and
   if the user answers in the affirmative to the message that asks whether the user wants to rate the application, displaying to the user one of:
      a website configured to receive ratings for the application; and
      a section of the application configured to receive ratings for the application.

4. The computer-implemented method of claim 1, wherein the interactions comprise executions of the application on the electronic device by the user.

5. The computer-implemented method of claim 4, wherein the familiarity threshold comprises a first number of executions per week over a number of consecutive weeks.

6. The computer-implemented method of claim 5, wherein a feedback threshold comprises a second number of executions over a second number of consecutive weeks.

7. The computer-implemented method of claim 1, wherein:
   the interactions comprise interactions between the user and a feature of the application that was introduced in a latest version of the application; and
   displaying a message that asks the user whether the user likes the application comprises displaying a message that asks the user whether the user likes the feature of the application.

8. The computer-implemented method of claim 1, wherein the interactions comprise at least one of the following:
   a time between the user opening a content item on the application and dismissing the content item;
   a posting of a comment on the content item by the user;
   a sharing of the content item by the user; and
   a liking of the content item by the user.

9. An apparatus, comprising:
   one or more processors; and
   memory storing instructions that, when executed by the one or more processors, cause the apparatus to:
      track, over a specified time period, multiple interactions between a user and one or more features of the application that indicate that the user has familiarity with the application or is unfamiliar with the application, wherein tracking the interactions comprises keeping a score that is increased when an interaction that indicates that the user has familiarity with the application occurs and decreased when an interaction that indicates that the user is unfamiliar with the application occurs, and wherein the application is configured to execute on an electronic device;

determine, based on the score, whether the interactions meet or exceed a familiarity threshold; and when the interactions meet or exceed the familiarity threshold:
  display a message that asks the user whether the user likes the application;
  if the user answers in the affirmative to the message that asks the user whether the user likes the application, assist the user in rating the application; and
  if the user answers in the negative to the message that asks the user whether the user likes the application, assist the user in providing feedback for the application.

10. The apparatus of claim 9, wherein the instructions further cause the apparatus to:
  while tracking the interactions, determine whether the interactions fall below a feedback threshold, wherein being below the feedback threshold indicates that the user would be more likely than not to provide feedback for the application; and
  if the interactions fall below the feedback threshold, cause the application to assist the user in providing feedback for the application.

11. The apparatus of claim 9, wherein assisting the user in rating the application comprises:
  displaying a message that asks whether the user wants to rate the application; and
  if the user answers in the affirmative to the message that asks whether the user wants to rate the application, displaying to the user one of:
    a website configured to receive ratings for the application; and
    a section of the application configured to receive ratings for the application.

12. The apparatus of claim 9, wherein the more interactions comprise executions of the application on the electronic device by the user.

13. The apparatus of claim 12, wherein the familiarity threshold comprises a first number of executions per week over a number of consecutive weeks.

14. The apparatus of claim 13, wherein a feedback threshold comprises a second number of executions over a second number of consecutive weeks.

15. The apparatus of claim 9, wherein:
  the interactions comprise interactions between the user and a feature of the application that was introduced in a latest version of the application; and
  displaying a message that asks the user whether the user likes the application comprises displaying a message that asks the user whether the user likes the feature of the application.

16. The apparatus of claim 9, wherein the interactions comprise at least one of the following:
  a time between the user opening a content item on the application and dismissing the content item;
  a posting of a comment on the content item by the user;
  a sharing of the content item by the user; and
  a liking of the content item by the user.

17. An electronic device comprising:
  a tracking module comprising a non-transitory computer-readable medium storing instructions that, when executed, cause the electronic device to:
    track, over a specified time period, multiple interactions between a user and one or more features of the application that indicate that the user has familiarity with the application or is unfamiliar with the application, wherein tracking the interactions comprises keeping a score that is increased when an interaction that indicates that the user has familiarity with the application occurs and decreased when an interaction that indicates that the user is unfamiliar with the application occurs, and wherein the application is configured to execute on an electronic device;
    determine, based on the score, whether the interactions meet or exceed a familiarity threshold; and
  a feedback module comprising a non-transitory computer-readable medium storing instructions that, when executed, cause the electronic device to, when the interactions meet or exceed the familiarity threshold:
    display a message that asks the user whether the user likes the application;
    if the user answers in the affirmative to the message that asks the user whether the user likes the application, assist the user in rating the application; and
    if the user answers in the negative to the message that asks the user whether the user likes the application, assist the user in providing feedback for the application.

18. The electronic device of claim 17, wherein the non-transitory computer-readable medium of the feedback module further stores instructions that, when executed, cause the electronic device to:
  while tracking the interactions, determine whether the interactions fall below a feedback threshold, wherein being below the feedback threshold indicates that the user would be more likely than not to provide feedback for the application; and
  if the interactions fall below the feedback threshold, cause the application to assist the user in providing feedback for the application.

19. The electronic device of claim 17, wherein assisting the user in rating the application comprises:
  displaying a message that asks whether the user wants to rate the application; and
  if the user answers in the affirmative to the message that asks whether the user wants to rate the application, displaying to the user one of:
    a website configured to receive ratings for the application; and
    a section of the application configured to receive ratings for the application.

20. The electronic device of claim 17, wherein the interactions comprise executions of the application by the user.

* * * * *